(12) United States Patent
Wilsher et al.

(10) Patent No.: US 8,164,796 B2
(45) Date of Patent: Apr. 24, 2012

(54) SEMI AUTOMATIC PUNCH HOLE REMOVAL

(75) Inventors: Michael J. Wilsher, Letchworth (GB); Azhar Malik, Edgware (GB); Peter Watson, Stevenage (GB)

(73) Assignee: Xerox Corporation, Norwalk, CT (US)

( * ) Notice: Subject to any disclaimer, the term of this patent is extended or adjusted under 35 U.S.C. 154(b) by 866 days.

(21) Appl. No.: 12/181,529

(22) Filed: Jul. 29, 2008

(65) Prior Publication Data

US 2010/0027076 A1    Feb. 4, 2010

(51) Int. Cl.
*G06T 5/00* (2006.01)
*G06K 9/40* (2006.01)

(52) U.S. Cl. ........................ 358/3.26; 382/275
(58) Field of Classification Search .................. None
See application file for complete search history.

(56) References Cited

U.S. PATENT DOCUMENTS

| | | | | |
|---|---|---|---|---|
| 5,335,086 | A * | 8/1994 | Kitamura | 358/463 |
| 5,752,053 | A * | 5/1998 | Takakura et al. | 715/219 |
| 6,594,401 | B1 * | 7/2003 | Metcalfe et al. | 382/275 |
| 2008/0240608 | A1 * | 10/2008 | Ishii | 382/275 |

OTHER PUBLICATIONS

Digitizing Documents: A complete workflow manual for the Klamath Waters Digital Library Published Jun. 9, 2006 pp. 1, 14-17 & 57.*
Adobe Photoshop 5.0 User Manual Published 1998, Adobe Systems Inc. (c) pp. 173-176 & 190-191 Available for download or viewing at http://www.csd.uoc.gr/docs/pdf/photoshop5_users_guide.pdf.*

* cited by examiner

*Primary Examiner* — Twyler Haskins
*Assistant Examiner* — Barbara Reinier
(74) *Attorney, Agent, or Firm* — Fay Sharpe LLP

(57) ABSTRACT

Systems and methods are described that facilitate removing punch hole artifacts in electronic document images. When a document with punch holes is scanned, the punch holes appear as unwanted dark spots in the margin. To remove these artifacts, a blanking regions having background color pixels are placed over the punch hole artifacts and the electronic document image is stored with the blanking regions in place. A user interface is provided to permit a user to enter blanking region parameters, including x,y coordinates, diameter, reference edge from which the coordinates are measured, etc. Default settings can be stored and recalled for common punch hole patterns, which may vary between offices and the like.

20 Claims, 5 Drawing Sheets

SEMI AUTOMATIC PUNCH HOLE REMOVAL

BACKGROUND

The subject application relates to image defect correction in a printing system. While the systems and methods described herein relate to compensating or correcting defects in a scanned or electronic image or document, it will be appreciated that the described techniques may find application in other printing systems, other xerographic applications, and/or other scanning systems.

When a hard copy of a document is scanned to generate an electronic copy thereof, artifacts can arise that degrade the quality of the electronic document. For instance, punch holes that have been punched in the margin of the document may appear as dark spots on the electronic document. Another type of artifact is "show-through," which occurs when images or text from the back side of the scanned page show through to the side being scanned. Yet another type of artifact involves show-through of a roller applied to the back of the scanned page.

Attempts to mitigate image show-through artifacts have included using a dark backing behind the scanned page. However, this technique makes punch holes appear darker. Attempts to mitigate roller show-through artifacts have included darkening the roller, but again this technique exacerbates punch hole artifacts because the darker roller shows through the punch holes more than a lighter roller would.

Other attempts at mitigating roller show-through have included placing a pattern on the roller, and employing software that detects the pattern where it shows through the punch holes and digitally corrects or removes the image of the punch hole. However, this technique is expensive and cost-prohibitive.

Less-expensive punch hole correction techniques include blanking out the entire length of the margin of the scanned page in which the punch holes are located. However, this technique is coarse and results in loss of information (e.g., hand-written notes, text, images, etc.) included in the blanked margin region.

Accordingly, there is an unmet need for systems and/or methods that facilitate removing punch holes in a scanned document image while overcoming the aforementioned deficiencies.

BRIEF DESCRIPTION

In accordance with various aspects described herein, systems and methods are described that facilitate removing unwanted artifacts from an electronic document image. For example, a method of removing punch hole artifacts in a scanned document comprises rendering an electronic image of a scanned document page, receiving user input related to blanking region parameters for one or more blanking regions to be applied to one or more punch hole artifacts on the page, and electronically storing the electronic image with the one or more blanking regions positioned over the one or more respective punch hole artifacts.

According to another feature described herein, a digital artifact removal system comprises a memory that stores computer-executable instructions for removing artifacts in an electronic image, and a processor that executes the instructions, applies blanking regions to the electronic image to cover unwanted artifacts, and assigns a color value to pixels the blanking regions consistent with a color value for background pixels in the electronic image.

Yet another feature relates to an apparatus for removing punch hole artifacts in an electronic image of a document, comprising means for rendering an electronic image of a scanned document page, means for receiving user input related to blanking region parameters for one or more blanking regions to be applied to one or more respective punch hole artifacts on the page, and means for electronically storing the electronic image with the one or more blanking regions positioned over the one or more respective punch hole artifacts.

DETAILED DESCRIPTION

Figure 1:
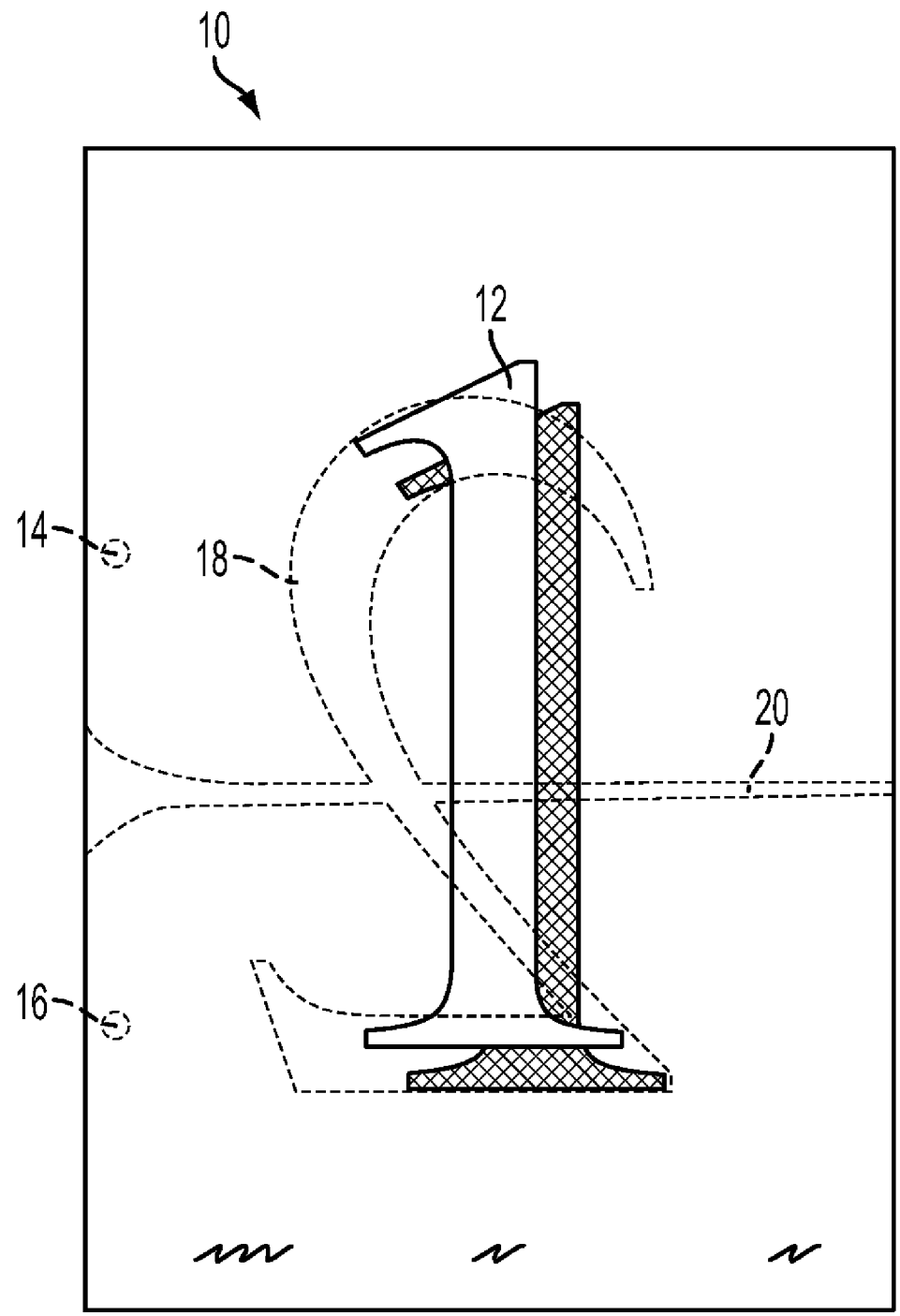
FIG. 1 illustrates an image of a document page (e.g., an electronic image of a scanned document or page, a pre-scan image of the page, etc.) includes a scanned image and several unwanted artifacts.

In accordance with various features described herein, systems and methods are described that facilitate removing punch holes in an electronic document, such as a scanned document image. With reference to FIG. 1, an image of a document page 10 (e.g., an electronic image of a scanned document or page, a pre-scan image of the page, etc.) includes a scanned image 12 and several unwanted artifacts. For instance, punch holes 14, 16 are present near the left margin of the page. A show-through artifact 18 can be seen through the page 10. In the depicted example, the scanned image 12 of a "1" includes a show-through artifact of a "2" on the back of the scanned page 10. Additionally, a roller show-through artifact 20 appears as a groove or dark line across the page 10.

In this particular example, the page 10 has image shows light gray punch holes 14, 16 and a back-side show-through artifact 18 that is enhanced by a light backing, and the design of a document handler such as a duplex automatic document handler (DADH) employed to generate the image results in a DADH roll groove show-through artifact 20. In some scanner implementations, the defects of back-side show-through and DADH groove show-through are minimized by darkening the backing or making the backing completely black. While this technique can mitigate the obvious defects, it exacerbates the punch holes, depending on the image backing.

Typically, the punch holes 14, 16 are in fairly fixed positions and are contained in a reasonably sized DADH job run. Accordingly, the systems and methods described herein provide an operator setup mechanism by which the location and size of the punch holes on the original document is specified by an operator. According to one aspect, default punch hole locations can be so the operator simply selects a "punch hole removal" icon or button to perform punch hole removal through a document or set of documents. For instance, if a company typically employs a two-hole punch to place two centered punch holes in a top margin of all documents to be inserted into a two-bracket file folder, then an operator can set the coordinates of the punch holes in an initial setup phase as default coordinates to be blanked out on all scanned documents run through the scanner.

Figure 2:
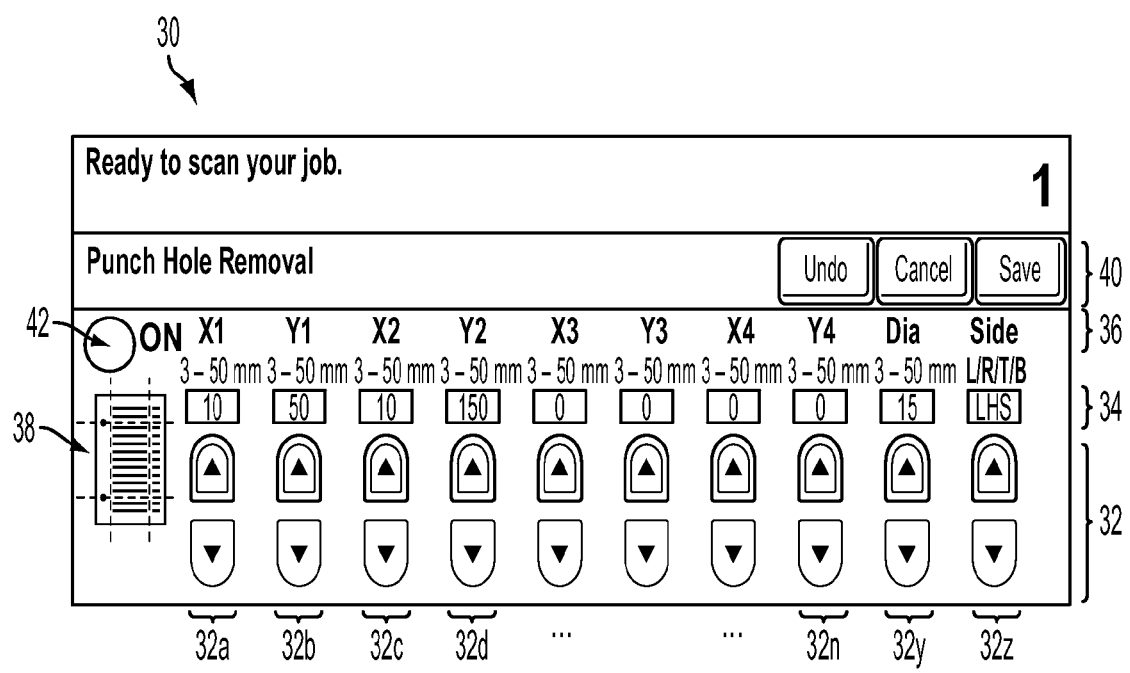
FIG. 2 illustrates a graphical user interface (GUI) that facilitates removing punch holes in a scanned document image, in accordance with various aspects described herein.

FIG. 2 illustrates a graphical user interface (GUI) 30 that facilitates removing punch holes in a scanned document image, in accordance with various aspects described herein. A plurality of controls 32 permit a user to increase or decrease values 34 for a plurality of parameters 36 associated with one or more "blanking regions" used to overlay or blank out the unwanted punch holes. For instance, an X-coordinate for a first punch hole blanking region can be entered and/or adjusted using a first control 32a, and a Y-coordinate therefor can be entered using a second control 32b. In this manner the coordinate position of the first punch hole blanking region can be entered. Additional punch hole blanking region coordinates are entered using a plurality of additionally X- and Y-coordinate controls 32. For instance, up to four sets of punch hole blanking region coordinates (e.g., X1,Y1, ..., X4,Y4) can be entered using the user interface 30 as shown, although more (e.g., 5, 6, 7, ..., n, where n is an integer) sets of coordinates and associated controls 32 may be provided in accordance with various aspects, as indicated by controls 32n.

In one example, the coordinates X1,Y1 of the center of the first punch hole blanking region have been entered using the controls 32a, 32b. Coordinates X2,Y2 of the center of the second punch hole blanking region have been entered using controls 32c, 32d. For instance, coordinates X1 and X2 are both set to 10 mm from the left-hand side (LHS) of the page, as indicated in the value field for the "side" parameter, which is selected using controls 32z. The side parameter field permits a user to select (e.g., using controls 32z) from among top, bottom, left-hand-side, and right-hand side as reference edges from which the X and Y coordinates are measured.

Coordinates Y1 and Y2 are entered as 50 mm and 150 mm, respectively. Entry of the Y coordinates is performed after selecting a "top" side (T) of the page in the value field for the side parameter using the controls 32z. In a related example, coordinates Y1 and Y2 can be set to 150 mm and 50 mm respectively, where the page has a Y-dimension of 200 mm and the side parameter is set to "bottom" (B) of the page. In general, "top" or "bottom" is selected when entering Y coordinates, and "left-hand side" or "right-hand side" is entered when entering X coordinates.

A diameter for a blanking region is selected using the controls 32y. In this example, the blanking diameter has been set to 15 mm to overlay slightly the punch holes in all directions. A visual representation 38 of the scanned page is provided to the user to provide real-time feedback of the position and size of the blanking regions as the user manipulates the controls 32. Additionally, the user can click on an action tab 40 to perform a desired action, such as undoing a previous action, cancelling input session, or saving parameter values the user has entered once the user is satisfied with the visual representation 38.

According to one aspect, once the user is satisfied with the visual representation 38 of the blanking regions on the scanned page, the user saves the settings as default settings. When subsequent punch hole removal jobs are initiated, a user selects an icon 42 to auto-populate the parameter value fields with the default settings. In this manner, a most common punch hole pattern can be efficiently blanked out. In another embodiment, multiple sets of default settings for different numbers of punch holes, different page edges along which the punch holes appear, etc., can be entered, stored, and subsequently recalled and selected depending on a particular punch hole removal job.

It will be appreciated that the controls 32 are not limited to the depicted increase and decrease buttons or arrows, but rather may include knobs, dials, horizontal buttons or arrows, slider bars, etc., any of which may be real or virtual. According to another aspect, the user may click on a value field 34 to select it, and then enter a desired value using a keyboard or the like.

Figure 3:
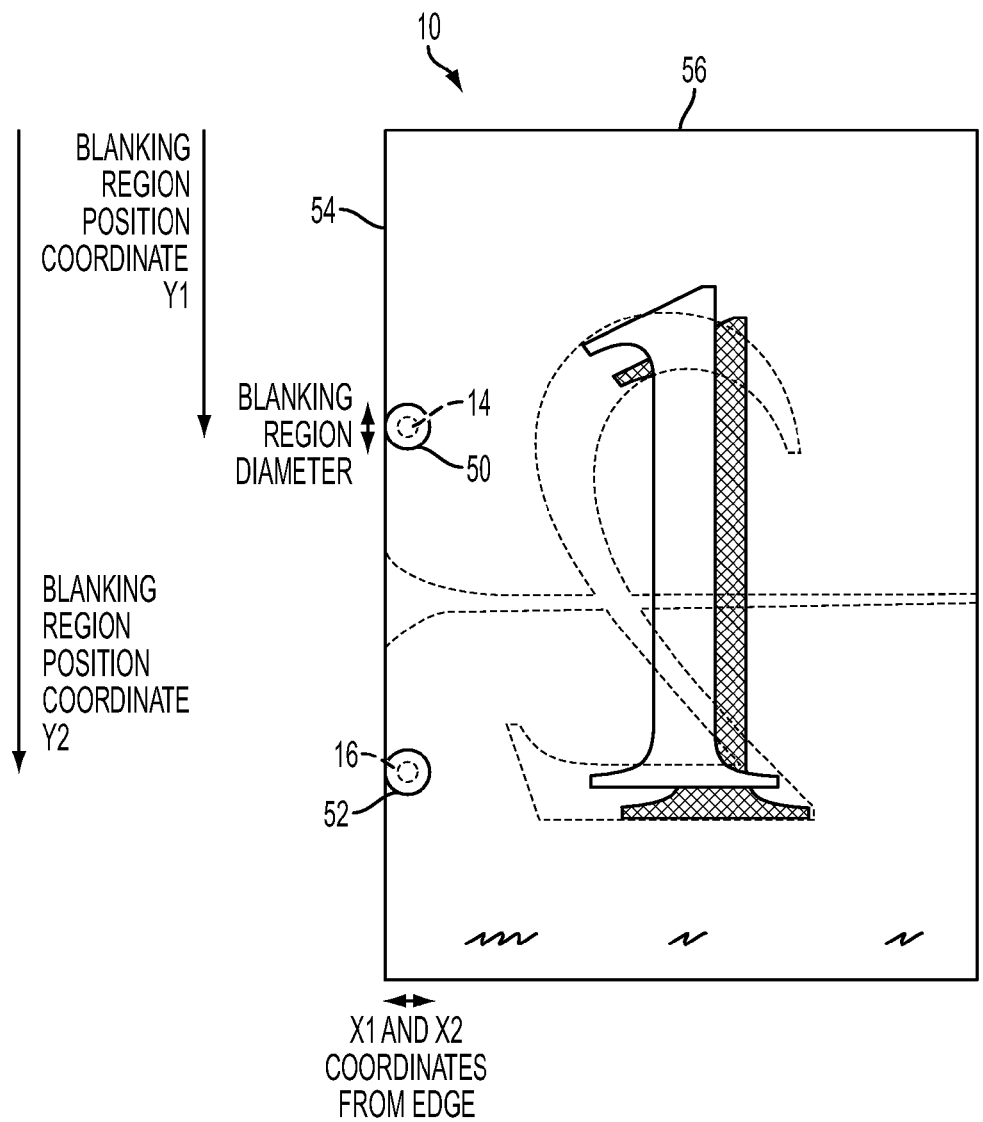
FIG. 3 is an illustration of the page after placement of blanking regions over the respective punch holes.

FIG. 3 is an illustration of the page 10 after placement of blanking regions 50, 52 over the respective punch holes 14, 16. For instance, once a user has entered parameter values using the user interface 30 (FIG. 2), the blanking regions 52, 54, have a selected diameter, which may be the same diameter or different diameters for each blanking region, and are positioned at a selected distance from a selected page side or edge. In the depicted example, the blanking regions are positioned at coordinates X1 and X2, respectively, from the left-hand side 54, and at coordinates Y1 and Y2, respectively, from the top side 56. To continue the example of FIG. 2, blanking region 52 is offset from the left-hand side by 10 mm, and from the top of the page by 50 mm. Blanking region 54 is offset from the left-hand side by 10 mm and from the top by 150 mm.

Figure 4:
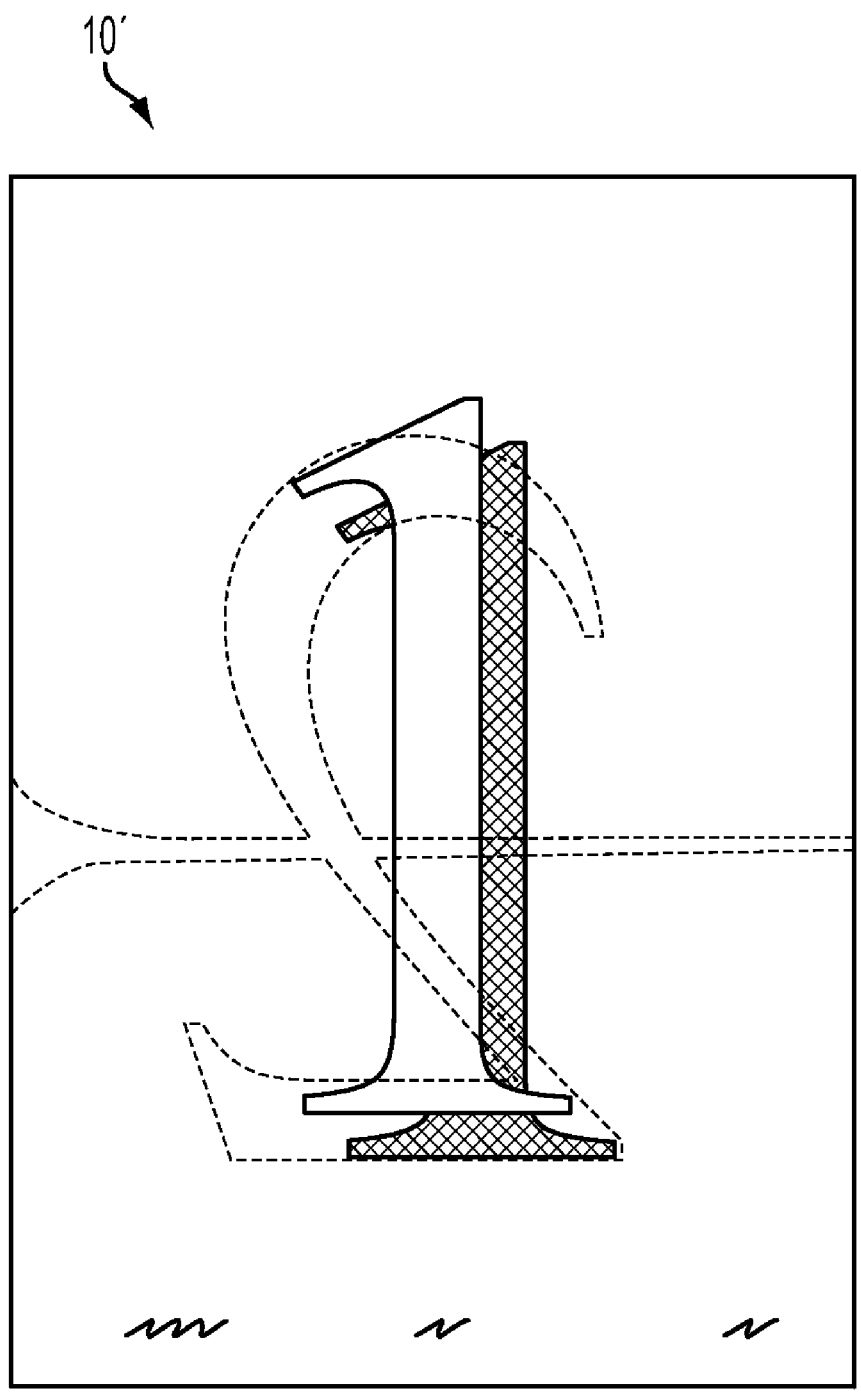
FIG. 4 illustrates a scanned page after scanning and removal of the punch holes.

FIG. 4 illustrates a scanned page 10' after scanning and removal of the punch holes 14, 16. According to one aspect, the page is scanned into system memory, and the blanking regions are stored as white pixels in memory to remove the punch holes form the document image. For duplex copies, the operator specifies punch hole removal on the edge as copied on side one, and if duplexing changes the edge, the algorithm makes adjustments accordingly on the second side. In another embodiment, the blanking region parameters for a punch hole are pre-specified or derived from the surrounding image area. If the document is scanned with Automatic Background Suppression, which reproduces the image relative to the image background, such that the image background comes out as white paper, blanking the specified hole area is sufficient.

Figure 5:
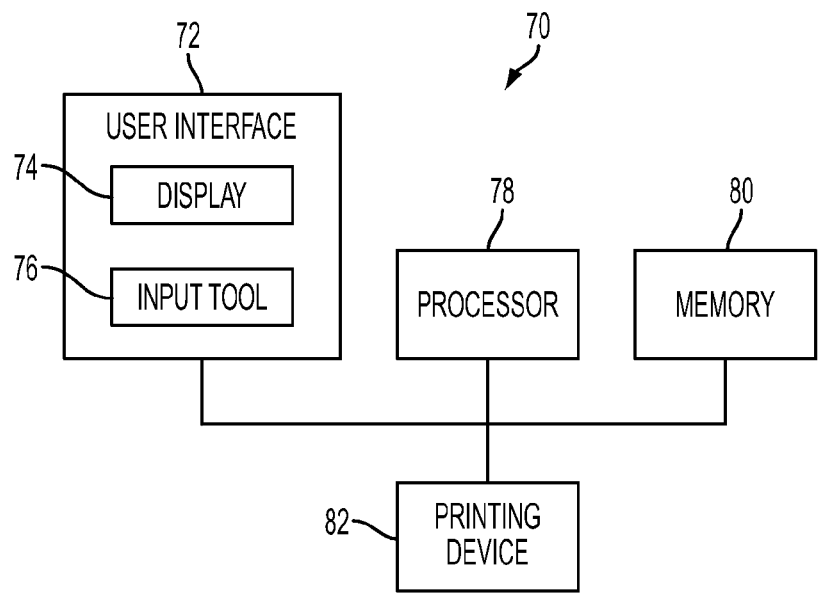
FIG. 5 illustrates a system that facilitates removing punch holes from an electronic document image, in accordance with various aspects described herein.

FIG. 5 illustrates a system 70 that facilitates removing punch holes from an electronic document image, in accordance with various aspects described herein. The system comprises a user interface 72, which may be similar to the user interface 30 of FIG. 2. The user interface comprises a display 74 on which the electronic document is displayed, and an input tool 76 that a user employs to input information associated with the punch holes (e.g., blanking region coordinate information, diameter, reference edge, etc.). A processor 78 and memory 80 (e.g., a computer-readable medium) are employed by a printing device 82 (e.g., a printer, scanner, etc.) during a scanning procedure, wherein the processor executes computer-executable instructions to store the document electronically such that the areas of the document covered by blanking regions are stored as white (or some other desired color) pixels, thereby blanking out the dark punch holes. The printing device can print the refined document (e.g., after punch hole removal) without artifacts caused by the punch holes.

It will be appreciated that the memory 80 stores, and the processor 78 executes, one or more computer-executable algorithms or instructions for performing the various functions and/or providing the various features described herein. For instance, such instructions can include instructions for: receiving user input related to blanking region coordinates and/or size, reference page edge, etc.; generating a visual or graphical representation of the document with and/or without blanking regions overlaid thereon, on the display 74; storing an electronic version or image of the document during scanning; storing pixels in the blanking region(s) as white pixels (or some other background color), etc.; printing the refined document without punch hole artifacts; etc.

In another example, the memory stores and the processor executes instructions for rendering blanking regions that are generated by a user by clicking and dragging a cursor over a punch hole or other unwanted artifact. For instance, the user can click a mouse near a punch hole artifact and drag a cursor across the artifact to create an ellipsoid or rectangular blanking region, and the processor executes stored instructions for detecting the blanking region parameters (e.g., size, coordinates, dimensions, etc.) for using in blanking out the unwanted artifact or information.

In a related embodiment, the input tool 76 is a mouse or stylus that the user clicks near a punch hole on the electronic image. The user then drags a cursor across the punch hole to generate an ellipsoid or rectangular shape (or other shape) to form the blanking region, and the processor detects the coordinates, size, shape, etc., of the blanking region for use when storing the electronic version of the page. Alternatively, the user draws a line around the artifact to generate the blanking region.

Pixels in the blanking region are stored as pixels having the same color as the background color for the page. For instance, if the back ground is white, then the pixels are stored with a value of 255 at 8 bpp, 65,535 at 16 bpp, etc., if the image is black and white. In other examples where the background of the document includes a non-grey color, the system assigns other color values (e.g., RGB, Lab, L*a*b*, etc.) to the blanking regions. Whatever the color assignment scheme, the blanking regions are made to appear in the final image as the same color as the background of the page or document, in order to hide or "remove" the punch holes.

In another embodiment, the processor executes stored instructions for analyzing margins of document pages, detecting punch holes, generating blanking regions thereon, and applying the blanking regions to the document upon user approval thereof.

In another embodiment, the blanking region coordinates are entered via the input tool 76 for one or more common punch hole patterns (e.g., 3-hole, left-hand margin; 2-hole top margin, etc.) such as may be frequently employed in a given office or printing arena, and stored as default settings. When a user desires to scan or print a page having the default pattern or arrangement of punch holes, the user selects the default settings for that pattern and runs the program to remove punch hole artifacts in the scanned document. In this manner, the user is spared from having to manually enter blanking region coordinates for each document processing job.

Figure 6:
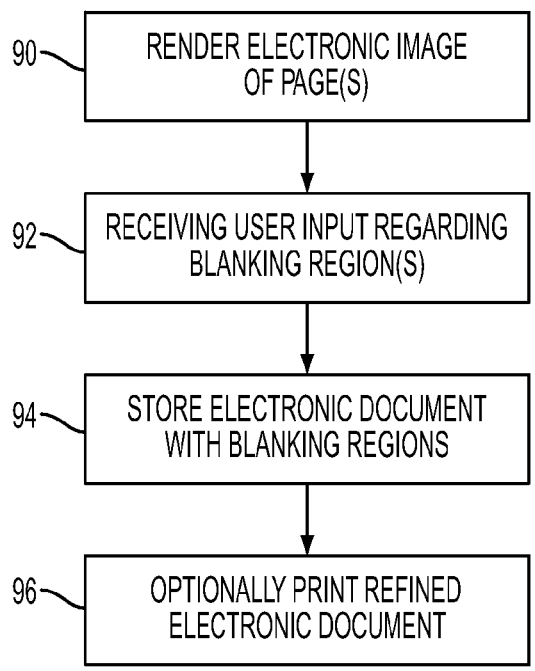
FIG. 6 is an illustration of a method for removing punch hole artifacts in a scanned document image, in accordance with one or more aspects described herein.

FIG. 6 is an illustration of a method for removing punch hole artifacts in a scanned document image, in accordance with one or more aspects described herein. At 90, an electronic or digital image of a page with punch holes is rendered on a display or the like. At 92, user input is received regarding blanking region(s) to be applied to the document. For instance, user input can comprise blanking region coordinate, diameter, and reference edge information, as described with regard to the preceding figures. In another example, user input includes blanking region information generated by clicking a mouse or stylus and dragging a cursor to generate a blanking region of a desired shape and size in a desired location on the page. According to another aspect, the user input comprises a selection of pre-generated default settings for blanking region parameters (e.g., size, coordinates, reference edge, etc.) that correspond to the particular orientation of the punch holes in the page(s).

At 94, an image of the electronic document is stored to memory, wherein pixels in the blanking region(s) are stored as having a color consistent with the background color of the scanned page. In one example, the background color is white. At 96, the page is optionally printed without the punch holes (or images thereof).

It is to be understood that the described systems and methods are not limited to punch hole removal in electronic documents, but rather may be employed in any scenario in which it is desirable to remove markings on a page. For instance, the systems and methods can be used for redacting documents, to remove personal information (e.g., social security numbers, bank account numbers, etc.) and the like. In another example, the systems and methods are used to remove other artifacts, such as smudges or other unwanted marks on a page. In another example, any portion of a page, up to an including an entire page or pages, can be blanked out using the described systems and methods in order to remove information. For instance, when only a hard copy of a document is available, the document can be scanned to generate an electronic image thereof, and blanking regions can be applied to remove unwanted artifacts or information.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of removing punch hole artifacts in a scanned document, comprising:
   rendering an electronic image of a scanned document page;
   receiving user input related to blanking region parameters for one or more blanking regions to be placed over one or more punch hole artifacts at preselected positions on a document page;
   storing the blanking region parameters corresponding to the one or more blanking regions;
   rendering an electronic image of a scanned document page;
   selectively positioning the one or more blanking regions at the preselected positions in accordance with the stored blanking region parameters; and
   electronically storing the electronic image with the one or more blanking regions located at the preselected positions over the one or more respective punch hole artifacts.

2. The method of claim 1, further comprising detecting a background color value for the scanned document page.

3. The method of claim 2, further comprising assigning the detected background color to pixels in the one or more the blanking regions.

4. The method of claim 3, wherein the blanking parameters comprise one or more of x,y coordinates for the center of each of the one or more blanking regions, reference page edges from which the respective x,y coordinates are measured, and at least one dimension of the blanking region.

5. The method of claim 4, wherein the reference page edge for the x-coordinate is one of a left-hand edge or a right-hand edge, and wherein the reference page edge for the y-coordinate is one of a top edge or a bottom edge.

6. The method of claim 4, wherein the at least one dimension is a diameter of the blanking region, and wherein the blanking region is circular.

7. The method of claim 4, wherein the at least one dimension comprises an x-dimension and a y-dimension, and wherein the blanking region is rectangular.

8. The method of claim 1, wherein the blanking parameters comprise one or more of x,y coordinates for the center of each of the one or more blanking regions, reference page edges from which the respective x,y coordinates are measured, and at least one dimension of the blanking region.

9. A digital artifact removal system, comprising:
- a memory that stores computer-executable instructions for removing artifacts in an electronic image; and
- a user interface for receiving user input related to blanking region parameters for one or more blanking regions to be placed over one or more punch hole artifacts at preselected positions on a document page;
- the memory for storing the blanking region parameters corresponding to the one or more blanking regions;
- an electronic input unit for rendering an electronic image of a scanned document page;
- a processor for selectively positioning the one or more blanking regions at the preselected positions in accordance with the stored blanking region parameters and assigns a color value to pixels in the blanking regions consistent with a color value for background pixels in the electronic image; and
- the memory electronically storing the electronic image with the one or more blanking regions located at the preselected positions over the one or more respective punch hole artifacts.

10. The system of claim 9, further comprising a user interface with a display on which the electronic image of a document page is presented to a user.

11. The system of claim 10, wherein the processor executes stored instructions for analyzing margins of the document page and detecting one or more punch hole artifacts.

12. The system of claim 11, wherein the processor executes instructions for overlaying a blanking region on each detected punch hole artifact, and storing the electronic image of the document page with the blanking regions overlaid thereon upon user approval of the blanking region positions.

13. The system of claim 10, further comprising a plurality of controls by which a user enters blanking region parameter information for one or more blanking regions to be overlaid on one or more respective punch hole artifacts.

14. The system of claim 13, wherein the blanking region parameters comprise one or more of x,y coordinates for the one or more blanking regions, at least one dimension for the one or more blanking regions, and reference page edge from which each of the x,y coordinates is measured.

15. The system of claim 14, wherein the at least one dimension of the blanking region is a diameter, and the blanking region is circular.

16. The system of claim 14, wherein the at least one dimension of the blanking region includes an x-dimension and a y-dimension, and the blanking region is rectangular.

17. The system of claim 10, further comprising a user input tool by which a user generates a blanking region over at least one unwanted artifact on the electronic image.

18. The system of claim 9, wherein the processor stores to the memory at least one set of default blanking region parameters comprising one or more of x,y coordinates for the one or more blanking regions, at least one dimension for the one or more blanking regions, and reference page edge from which each of the x,y coordinates is measured.

19. An apparatus for removing punch hole artifacts in an electronic image of a document, comprising:
- means for rendering an electronic image of a scanned document page;
- a means for receiving user input related to blanking region parameters for one or more blanking regions to be placed over one or more punch hole artifacts at preselected positions on a document page;
- a means for storing the blanking region parameters corresponding to the one or more blanking regions;
- a means for rendering an electronic image of a scanned document page;
- a means for selectively positioning the one or more blanking regions at the preselected positions in accordance with the stored blanking region parameters; and
- a means for electronically storing the electronic image with the one or more blanking regions located at the preselected positions over the one or more respective punch hole artifacts.

20. The apparatus of claim 19, further comprising:
- means for assigning a color values associated with background pixels in the electronic image to pixels in the blanking regions;
- wherein the blanking region parameters comprising one or more of x,y coordinates for the one or more blanking regions, at least one dimension for the one or more blanking regions, and reference page edge from which each of the x,y coordinates is measured.

\* \* \* \* \*